United States Patent
Kamigawa et al.

(10) Patent No.: US 6,882,520 B2
(45) Date of Patent: Apr. 19, 2005

(54) SOLID ELECTROLYTIC CAPACITORS

(75) Inventors: Hidenori Kamigawa, Higashiosaka (JP); Kouichi Morita, Hirakata (JP); Hitoshi Ibuta, Hirakata (JP)

(73) Assignees: Tyco Electronics Raychem K.K., Kawasaki (JP); Sanyo Electric Co., Ltd., Moriguchi (JP); Sanyo Electronic Components Co., Ltd., Daito (JP)

(*) Notice: Subject to any disclaimer, the term of this patent is extended or adjusted under 35 U.S.C. 154(b) by 0 days.

(21) Appl. No.: 10/721,867

(22) Filed: Nov. 26, 2003

(65) Prior Publication Data

US 2004/0105197 A1 Jun. 3, 2004

(30) Foreign Application Priority Data

Dec. 3, 2002 (JP) .......................... 2002-350698
Dec. 26, 2002 (JP) .......................... 2002-378501

(51) Int. Cl.[7] .............................................. H01G 9/00
(52) U.S. Cl. ..................... 361/523; 361/516; 361/524; 361/525; 361/528; 361/529; 29/25.03
(58) Field of Search ................................ 361/523, 524, 361/525, 528, 529, 530, 516, 518, 519, 538, 539, 507, 509; 29/25.03

(56) References Cited

U.S. PATENT DOCUMENTS

| | | | |
|---|---|---|---|
| 5,378,407 A | | 1/1995 | Chandler et al. ........... 252/513 |
| 6,110,234 A | * | 8/2000 | Sakata et al. .............. 29/25.03 |
| 6,197,184 B1 | * | 3/2001 | Hemphill et al. ........... 205/333 |
| 6,320,742 B1 | * | 11/2001 | Wada et al. ................. 361/528 |
| 6,552,896 B1 | * | 4/2003 | Igaki et al. ................. 361/523 |
| 6,560,090 B1 | * | 5/2003 | Uenishi et al. ............. 361/529 |

FOREIGN PATENT DOCUMENTS

| | | |
|---|---|---|
| JP | 6-20891 | 1/1994 |
| JP | 9-129520 | 8/1997 |
| JP | 11-176695 | 7/1999 |

* cited by examiner

Primary Examiner—Dean A. Reichard
Assistant Examiner—Nguyen T. Ha
(74) Attorney, Agent, or Firm—Armstrong, Kratz, Quintos, Hanson & Brooks, LLP

(57) ABSTRACT

The invention provides a solid electrolytic capacitor which comprises a capacitor element including an anode body having an anode leading member, and a dielectric coating layer, a solid electrolyte layer and a cathode leading layer which are formed successively over a surface of the anode body. The anode leading member has an anode terminal member connected thereto, the cathode leading layer has a cathode terminal member connected thereto, and the capacitor element is covered with a packaging resin portion. The cathode terminal member is connected to the cathode leading layer with current control means provided therebetween. The current control means comprises a current control layer reversibly increasable in electrical resistance with overcurrent or excessive heat, and a pair of electrode members each in the form of a plate or foil and having the current control layer sandwiched therebetween. The electrode members are joined to the cathode leading layer and the cathode terminal member, respectively.

27 Claims, 8 Drawing Sheets

US 6,882,520 B2

SOLID ELECTROLYTIC CAPACITORS

FIELD OF THE INVENTION

The present invention relates to solid electrolytic capacitors which are diminished in the self-generation of heat due to short-circuit malfunctions.

BACKGROUND ART

Typical solid electrolytic capacitors of the prior art have the construction shown in FIG. 14. A capacitor element 15 comprises a generally rectangular parallelepipedal anode body 1, and an anode leading member 16 in the form of a rod and embedded in the anode body 1. The anode body 1 is a sintered body of valve metal (such as tantalum, niobium, titanium, aluminum or the like). The anode body 1 has a dielectric coating layer 2 formed over the surface thereof by oxidizing. Formed over the dielectric coating layer 2 is a solid electrolyte layer 3, which in turn has a cathode leading layer 4 formed thereon. The solid electrolyte layer 3 is made from an electrically conductive inorganic material such as manganese dioxide, or an electrically conductive organic material such as a TCNQ complex salt or electrically conductive polymer. The cathode leading layer 4 is made, for example, from carbon or silver.

A platelike anode terminal member 61 is joined to the anode leading member 16 by resistance welding. A platelike cathode terminal member 62 is joined to the cathode leading layer 4 using an electrically conductive adhesive 5. The capacitor element 15 is covered with a packaging resin portion 7 having a substantially rectangular parallelepipedal configuration. The anode terminal member 61 and the cathode terminal member 62 partly extend through the resin portion 7 to the outside, and are bent downward along the outer surface of the packaging resin portion 7. The anode terminal member 61 and the cathode terminal member 62 each have an outer end portion disposed along the lower side of the resin portion 7 and soldered to a mount base board.

When the anode and the cathode of such a solid electrolytic capacitor short-circuit, for example, due to a break of or damage to the dielectric coating layer 2, self-generation of heat occurs, possibly producing fumes or a fire in an extreme case. In the case where the solid electrolyte layer 3 is made from a conductive inorganic material, the layer 3 is less likely to undergo healing until becoming heated to a considerably high temperature even in the event of self-generation of heat. Further when the conductive inorganic material contains oxygen, the solid electrolyte layer is prone to fuming or ignition. With solid electrolytic capacitors wherein a conductive inorganic material is used for the solid electrolyte layer 3, it is therefore practice to provide between the cathode leading layer 4 and the cathode terminal member 62 a fuse which is irreversibly breakable with overcurrent or excessive heat as a countermeasure against short-circuit current (see the publication of JP-A No. 1994-20891).

As a countermeasure against short-circuiting, it is also practice to provide a current control layer which is reversibly increasable in electrical resistance with overcurrent or excessive heat, between the cathode leading layer 4 of the solid electrolytic capacitor and the cathode terminal member 62 thereof (see the publication of JP-A No 1997-129520). This current control layer is made from an insulating polymer having electrically conductive particles admixed therewith. The layer is low in resistance value at room temperature owing to many conductive paths produced by the contact of conductive particles, whereas when heated to a high temperature, the layer exhibits a high resistance value due to the expansion of the insulating polymer which diminishes the conductive paths. In the event of a rise in temperature due to short-circuit current, therefore, the short-circuit current flowing through the solid electrolytic capacitor is restricted to a very small value. Ceramic capacitors are also known which have a current control element serving as a countermeasure against short-circuiting and comprising such a current control layer as sandwiched between metal plates (see the publication of JP-A No. 1999-176695).

One of the features of solid electrolytic capacitors is being low in equivalent series resistance (ESR). With electronic devices adapted to exhibit higher performance, it is desired that solid electrolytic capacitors be further lower in ESR. Widely used in recent years are solid electrolytic capacitors which comprise a solid electrolyte layer 3 made from a conductive polymer which is 10 to 100 times as high as the manganese dioxide in conductivity.

However, if the solid electrolytic capacitor is provided with a fuse serving as a countermeasure against short-circuiting as described above, the fuse which is none other than a resistor gives greatly increased ESR to the capacitor. It is therefore impossible to provide a fuse in solid electrolytic capacitors which are designed for reduced ESR, especially in those wherein a conductive polymer is used.

The fuse provided in solid electrolytic capacitors has another problem in that it is difficult to serve as a countermeasure against fuming and ignition due to a moderate rise in temperature although capable of serving such a function against instantaneous overcurrent. In order to prevent fuming and ignition due to such a rise in temperature, the solid electrolytic capacitor must be provided with current control means which functions at a temperature lower than the melting point (200 to 300° C.) of usual fuses, preferably at 100 to 150° C. The packaging resin portion 7 of the solid electrolytic capacitor is prepared by heating, for example, a solid epoxy resin at about 180° C. for melting, pouring the molten resin into a mold and thereafter holding the mold at the same temperature for several minutes for thermal curing. Accordingly, if an irreversible element such as a fuse of low melting point is used as current control means for the solid electrolytic capacitor, the current control means will melt in the course of fabrication of the packaging resin portion 7 of the capacitor.

The conventional current control layer for use in solid electrolytic capacitors as disclosed in the publication of JP-A No. 1997-129520 undergoes healing at a high temperature of over 300° C. and is therefore unsuitable for preventing fuming and ignition due to a moderate rise in temperature. Furthermore, if the current control layer is formed directly between the cathode leading layer 4 and the cathode terminal member 62 in the process for fabricating the solid electrolytic capacitor, the process will then require a prolonged period of time and become more cumbersome. Additionally, experiments conducted by the present inventor have revealed that solid electrolytic capacitors having such a current control layer are comparable in ESR to those having a fuse. Presently, solid electrolytic capacitors having low ESR and comprising a current control layer still remain to be realized.

The present invention, which overcomes the above problems, provides a solid electrolytic capacitor having low ESR and comprising a current control layer, and more particularly a solid electrolytic capacitor which comprises a current control layer and which is adapted to control current at a lower temperature than conventional solid electrolytic capacitors, the capacitor being capable of controlling current after fabrication even if exposed to a high temperature during the process of fabrication.

SUMMARY OF THE INVENTION

The present invention provides a solid electrolytic capacitor comprising a capacitor element including an anode body having an anode leading member, and a dielectric coating layer, a solid electrolyte layer and a cathode leading layer which are formed successively over a surface of the anode body, the anode leading member having an anode terminal member connected thereto, the cathode leading layer having a cathode terminal member connected thereto, the capacitor element being covered with a packaging resin portion; the solid electrolytic capacitor being characterized in that the cathode terminal member is connected to the cathode leading layer with current control means provided therebetween; the current control means comprising a current control Layer reversibly increasable in electrical resistance with overcurrent or excessive heat, and a pair of electrode members each in the form of a plate or foil and having the current control layer sandwiched therebetween; the electrode members being joined to the cathode leading layer and the cathode terminal member respectively.

The present invention further provides a solid electrolytic capacitor comprising a capacitor element including an anode body having an anode leading member, and a dielectric coating layer, a solid electrolyte layer and a cathode leading layer which are formed successively over a surface of the anode body, the anode leading member having an anode terminal member connected thereto, the cathode leading layer having a cathode terminal member connected thereto, the capacitor element being covered with a packaging resin portion; the solid electrolytic capacitor being characterized in that the anode terminal member is connected to the anode leading member with current control means provided therebetween; the current control means comprising a current control layer reversibly increasable in electrical resistance with overcurrent or excessive heat, and a pair of electrode members each in the form of a plate or foil and having the current control layer sandwiched therebetween; the electrode members being joined to the anode leading member and the anode terminal member respectively.

With the solid electrolytic capacitor of the invention, the current control layer is a layer prepared from an insulating polymer having electrically conductive particles admixed therewith.

The present invention further provides a solid electrolytic capacitor comprising a current control layer for controlling short-circuit current, the current control layer being prepared from an insulating polymer having electrically conductive particles admixed therewith and being sandwiched between a pair of electrode members made of at least one of nickel and copper. The electrode member is a nickel plate, nickel foil, copper plate, copper foil, nickel-plated copper plate or nickel-plated copper foil.

The solid electrolytic capacitor exhibits low ESR when having incorporated therein current control means which comprises a current control layer reversibly increasable in electrical resistance with overcurrent or excessive heat, and a pair of electrode members each in the form of a plate or foil and having the current control layer sandwiched therebetween. The capacitor is capable of controlling current at a lower temperature than the conventional solid electrolytic capacitors comprising a current control layer. Furthermore, even when exposed to a high temperature during fabrication, the capacitor fabricated is capable of controlling current.

When the electrode members are each in the form of a plate or foil, the current control layer is easy to handle in the process for fabricating the capacitor, and becomes easy to provide on the anode side. Further when the current control mean is provided in the form of an element, i.e., as a current control element, the solid electrolytic capacitor becomes easy to fabricate. When the anode terminal member or cathode terminal member is made to partly serve as an electrode member, the capacitor can be constructed with a reduced number of components.

Preferably, the electrode members sandwiching the current control layer therebetween is made from at least one of nickel and copper. Further when the current control layer is made from a polyethylene resin having conductor particles admixed therewith, the layer exhibits a greatly increased resistance value at about 120° C. and higher temperatures, and is capable of controlling short-circuit current of the capacitor at a considerably lower temperature than the solid electrolytic capacitors having a conventional current control layer.

DETAILED DESCRIPTION OF THE INVENTION

Embodiments of the present invention will be described below.

(First Embodiment)

Figure 1:
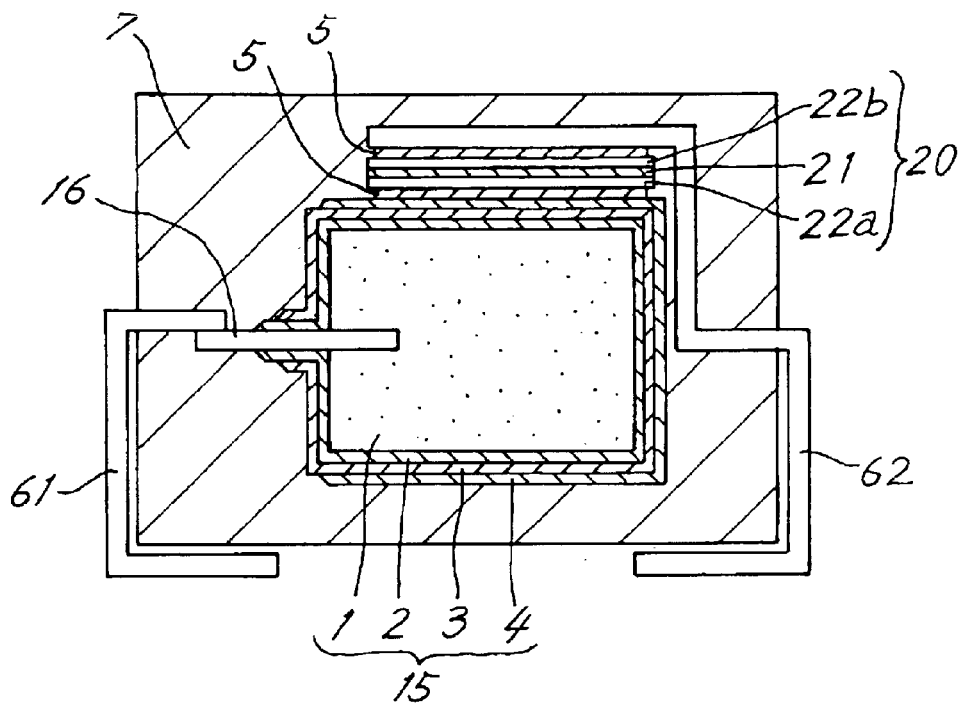
FIG. 1 is a view in vertical section and showing a solid electrolytic capacitor of first embodiment of the invention.

FIG. 1 is a view in vertical section of a solid electrolytic capacitor of first embodiment of the invention. A capacitor element 15 comprises an anode body 1 having an anode leading member 16 in the form of a rod and embedded in the body 1. The anode body 1 is a substantially rectangular parallelepipedal sintered body of valve metal. According to the present embodiment, a sintered body of tantalum is used as the anode body 1, whereas a sintered body of aluminum, niobium, titanium, zirconium or the like may alternatively be used. Further according to the present embodiment, a tantalum wire is used as the anode leading member 16.

The sintered body is immersed in an aqueous solution of $H_2PO_4$ and subjected to an anodic oxidation treatment, whereby a dielectric coating layer 2 is formed over the surface of the anode body 1. The anode body 1 resulting from the anodic treatment is subjected to a polymerization treatment to thereby form a solid electrolyte layer 3 on the dielectric coating layer 2. Polypyrrole, polythiophene, polyaniline or like electrically conductive polymer, or a derivative of such a polymer is used for the solid electrolyte layer 3. With the present embodiment, the solid electrolyte layer 3 is made of polypyrrole. Formed over the electrolyte layer 3 is a cathode leading layer 4 of carbon, silver or the like.

A platelike cathode terminal member 62 is connected to the capacitor element 15 with current control means 20 provided therebetween. The current control means 20 comprises a first electrode member 22a, a second electrode member 22b and a current control layer 21 sandwiched between these electrode members and reversibly increasable in electrical resistance with overcurrent or excessive heat. The first electrode member 22a is joined to the cathode leading layer 4 of the capacitor element 15 with an electrically conductive adhesive 5 containing silver. The cathode terminal member 62 is similarly joined to the second electrode member 22b.

The current control layer 21 is prepared from an insulating polymer having electrically conductive particles admixed therewith. The layer 21 is produced, for example, from an insulating polymer having incorporated therein a conductive filler as conductive particles, such as conductive carbon black particles, by kneading, by extruding the polymer into a sheet. The insulating polymer to be used is preferably a polyolefin, especially a polyethylene resin. The materials and production method of the current control layer 21 described above are also true of second to ninth embodiments to be described below.

Preferably, the first electrode member 22a and the second electrode member 22b, which are made of a conductive metal, are each in the form of a plate or foil. Further preferably, these electrode members 22a, 22b are made from at least one of nickel and copper. Stated more specifically, it is desirable that one or each of the first electrode member 22a and the second electrode member 22b be a nickel plate, nickel foil, copper plate, copper foil, nickel-plated copper plate or nickel-plated copper foil. The shape and material of the electrode members 22a, 22b described above are also true of the electrode members 22a, 22b of the second to ninth embodiments to be described later.

A platelike anode terminal member 61 is joined to the anode leading member 16, for example, by resistance welding. According to the present embodiment, the anode terminal member 61 and the cathode terminal member 62 are made of 42 alloy. The capacitor element 15 is covered with a packaging resin portion 7 made from an epoxy resin. The terminal members 61, 62 partly extend through the packaging resin portion 7 to the outside and are bent downward along the outer surface of the resin portion 7. The anode terminal member 61 and the cathode terminal member 62 have respective outer end portions which are arranged along the lower side of the resin portion 7 and serve as the respective anode terminal and cathode terminal of the capacitor.

According to the invention, the method of forming the first electrode member 22a, second electrode member 22b and current control layer 21 is not limited specifically. In the process for fabricating the capacitor of the first embodiment, the first and second electrode members 22a, 22b can be formed, for example, by applying an electrically conductive metal paste, such as nickel or copper paste, to the cathode leading layer 4 of the capacitor element 15 and to the current control layer 21. However, use of a conductive metal plate, such as nickel plate, or conductive metal foil such as nickel foil, for the first and second electrode members 22a, 22b simplifies the process for fabricating the solid electrolytic capacitor.

Figure 2:
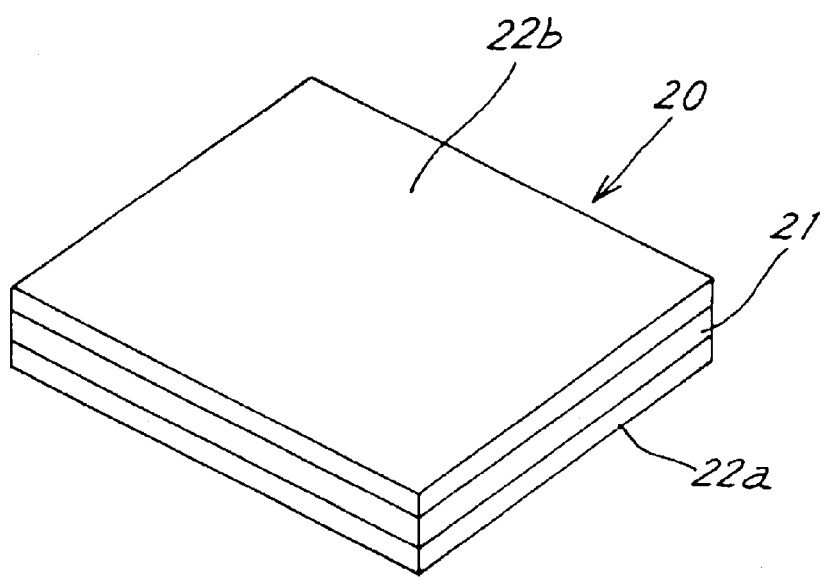
FIG. 2 is a perspective view of current control means in the form of an element and for use in the solid electrolytic capacitor of first embodiment of the invention.

The capacitor of the first embodiment can be fabricated by forming a first electrode member 22a, current control layer 21 and second electrode member 22b successively on the cathode leading layer 4 of the capacitor element 15, but it is cumbersome to form these components of the current control means 20 one after another on the side surface of the capacitor element 15. This necessitates a longer period of time for fabricating the capacitor. As shown in FIG. 2, therefore, prepared in advance separately from the capacitor element 15 is current control means 20 in the form of an element, i.e., a current control element, comprising a first electrode member 22a, a second electrode member 22b, and a current control layer 21 sandwiched between the members 22a, 22b. The current control means 20 in the form of an element is then joined to the cathode leading layer 4 with the electrically conductive adhesive 5, and the cathode terminal member 62 is joined to the current control means 20 with the conductive adhesive 5. This shortens the process for fabricating the solid electrolytic capacitor having the current control layer 21. (The current control means 20 as joined to the cathode terminal member 62 in advance may alternatively be joined to the cathode leading layer 4.)

Although the current control means 20 in the form of an element can be made, for example, by applying a nickel paste or like conductive metal paste to opposite sides of a current control layer 21, the current control means 20 can be produced easily as an element by joining to the current control layer 21 electrode members 22a, 22b which are each a conductive metal plate. The conductive metal plate to be used is preferably a nickel plate, copper plate or nickel-plated copper plate. The conductive metal foil to be used is preferably nickel foil, copper foil or nickel-plated copper foil. The first electrode member 22a and the second electrode member 22b, each in the form of a plate or foil, are thermally bonded under pressure (thermo-compression bonded) to the respective opposite sides of the current control layer 21 which is prepared in advance.

(Second Embodiment)

Figure 3:
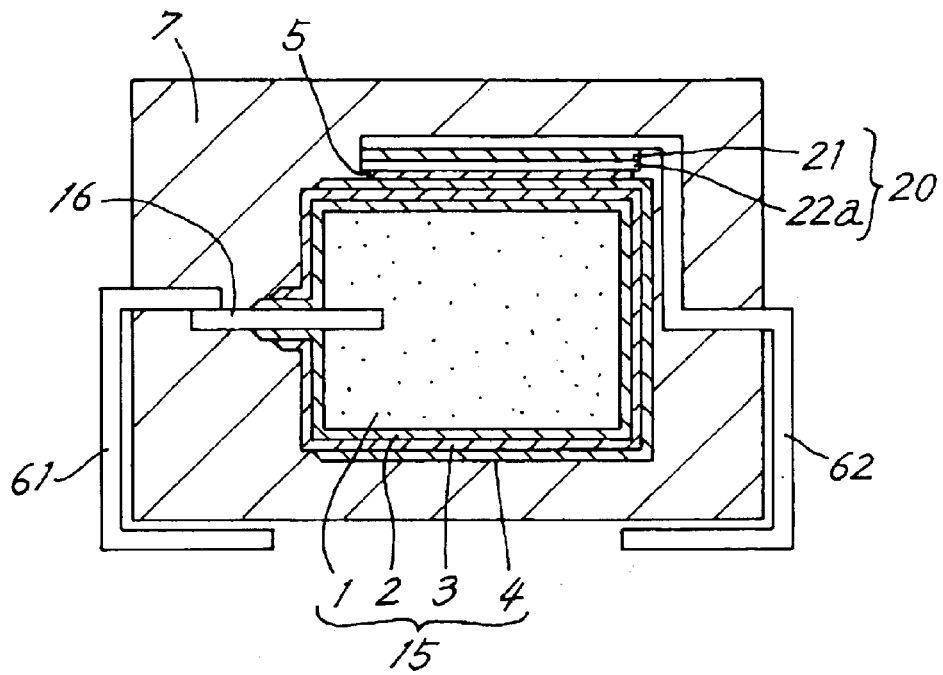
FIG. 3 is a view in vertical section and showing a solid electrolytic capacitor of second embodiment of the invention.

FIG. 3 is a view in vertical section and showing a solid electrolytic capacitor of second embodiment of the invention. The second electrode member 22b included in the first embodiment is omitted from the present embodiment, and the current control layer 21 is held between the first electrode member 22a and the cathode terminal member 62. The cathode terminal member 62 serves the function of the second electrode member 22b of the first embodiment. In other words, the cathode terminal member 62 partly serves as the second electrode member 22b shown in FIG. 1. Because of this construction, the solid electrolytic capacitor has a smaller number of components. If the first electrode member 22a, current control layer 21 and cathode terminal member 62 are prepared in the form of an element separate from the capacitor element 15, the process for fabricating the capacitor can be shortened.

Since it is desirable to sandwich the current control layer 21 between electrode members of at least one of nickel and copper according to the invention, it is desirable that the cathode terminal member 62 be made from at least one of nickel and copper. Alternatively, a cathode terminal member 62 of a conductive metal (e.g., 42 alloy) other than nickel and copper may be plated with nickel or copper.

(Third Embodiment)

Figure 4:
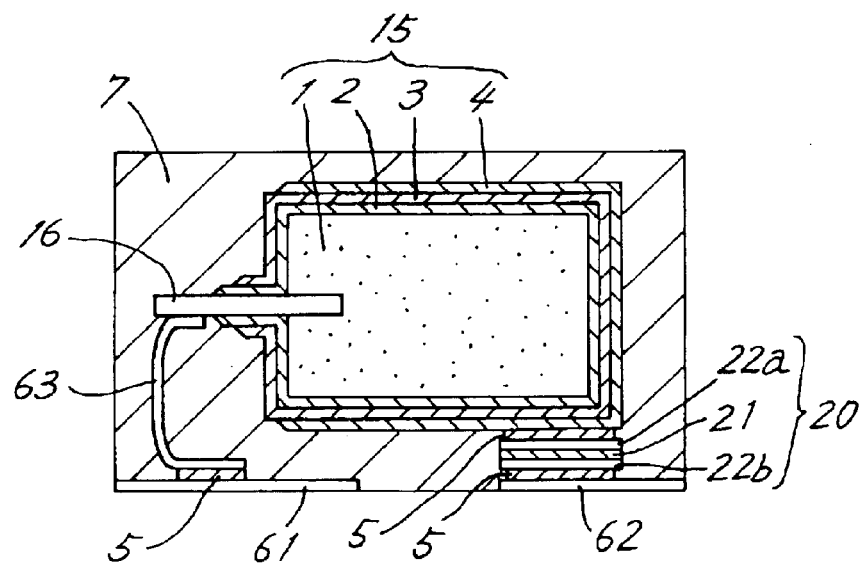
FIG. 4 is a view in vertical section and showing a solid electrolytic capacitor of third embodiment of the invention.

FIG. 4 is a view in vertical section and showing a solid electrolytic capacitor of third embodiment of the invention. According to this embodiment, the anode terminal member 61 and the cathode terminal member 62 are each in the form of a flat plate, and are positioned in a substantially same plane beneath the packaging resin portion 7 and spaced apart from each other. The current control means 20 is disposed under the anode body 1. The cathode terminal member 62 is disposed beneath the current control means 20. The first electrode member 22a of the current control means 20 is joined to the lower surface of the anode body 1 with the electrically conductive adhesive 5. The second electrode 22b is joined to the upper surface of the cathode terminal member 62 with the conductive adhesive 5.

The anode leading member 16 extends generally horizontally from the anode body 1, and the anode terminal member 61 is disposed under the anode leading member 16. The anode terminal member 61 is connected to the anode leading member 16 by a connecting member 63 of conductive metal provided substantially vertically. The connecting member 63 has a generally horizontal end portion, which is joined to the upper surface of the terminal member 61 with the conductive adhesive 5. The other end portion of the connecting member 63 is also made substantially horizontal and joined to the leading member 16 by resistance welding. The anode terminal member 61 and the cathode terminal member 62 have a shorter length (current path) according to the second embodiment than in the first embodiment. This renders the solid electrolytic capacitor smaller in size and in ESR.

(Fourth Embodiment)

Figure 5:
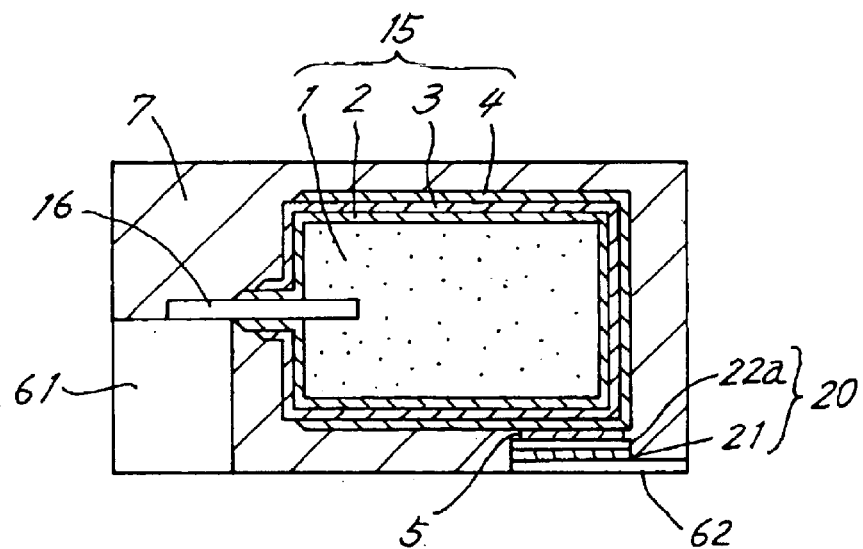
FIG. 5 is a view in vertical section and showing a solid electrolytic capacitor of fourth embodiment of the invention.

FIG. 5 is a view in vertical section and showing a solid electrolytic capacitor of fourth embodiment of the invention. According to this embodiment, the second electrode member 22b is omitted as in the second embodiment. The current control layer 21 is sandwiched between the first electrode member 22a and the cathode terminal member 62. The anode terminal member 61 is in the form of a block, and the anode leading member 16 is joined to the upper surface of the terminal member 61. The bottom surface of the anode terminal member 61 is positioned in substantially the same plane as the bottom surface of the packaging resin portion 7.

(Fifth Embodiment)

Figure 6:
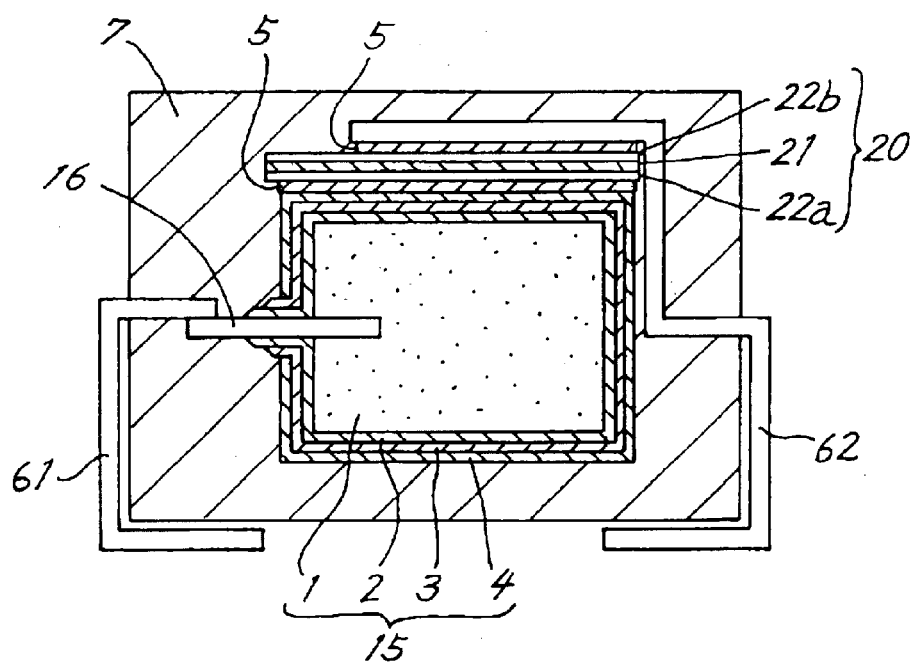
FIG. 6 is a view in vertical section and showing a solid electrolytic capacitor of fifth embodiment of the invention.

FIG. 6 is a view in vertical section and showing a solid electrolytic capacitor of fifth embodiment of the invention. The fifth embodiment is similar to the first embodiment in construction, but differs therefrom in that the current control means 20 is provided over the entire area of the upper surface of the capacitor element 15 to which the control means 20 is joined. Joining the current control means 20 to the capacitor element 15 so as to cover the surface thereof increases the area of contact of the current control means 20 with the capacitor element 15 to reduce the ESR of the capacitor. Incidentally, the second to fourth embodiments can be modified in the same manner as the fifth embodiment. The third and fourth embodiments of capacitors are then so modified that the current control means 20 covers the entire lower surface of the capacitor element 15.

(Sixth Embodiment)

Figure 7:
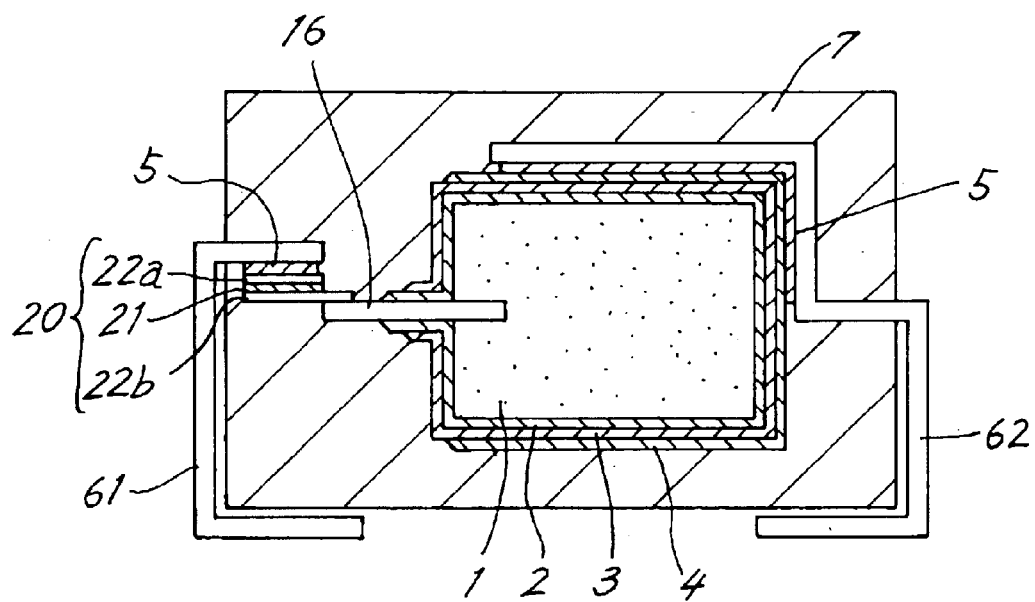
FIG. 7 is a view in vertical section and showing a solid electrolytic capacitor of sixth embodiment of the invention.

FIG. 7 is a view in vertical section and showing a solid electrolytic capacitor of sixth embodiment of the invention. According to this embodiment, the current control means 20 is provided between the anode leading member 16 and the anode terminal member 61. The current control means 20 comprises a first electrode member 22a in the form of a plate or foil, a second electrode member 22b in the form of a plate, and a current control layer 21 sandwiched between these electrode members. The second electrode member 22b is greater than the first electrode member 22a and the current control layer 21 in area. The first electrode member 22a is joined to the anode terminal member 61 with the conductive adhesive 5. The second electrode member 22b has an extension portion not in contact with the current control layer 21 and welded to the anode leading member 16 by resistance welding.

Figure 8:
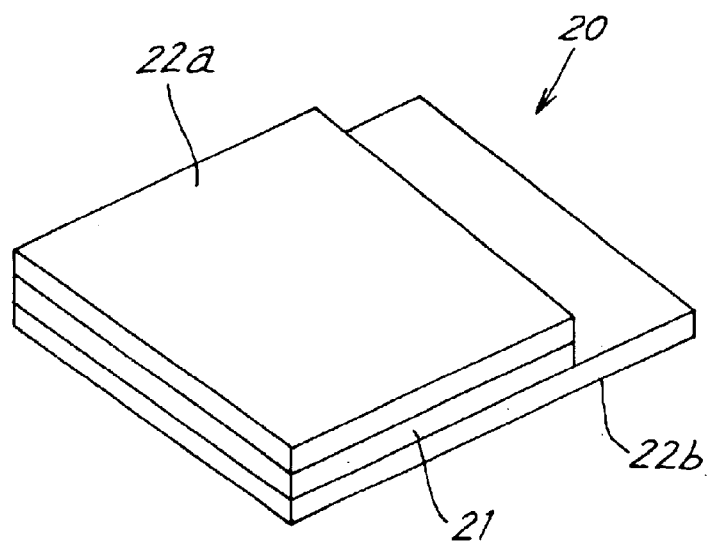
FIG. 8 is a perspective view of current control means in the form of an element and for use in the solid electrolytic capacitor of seventh embodiment of the invention.

In the process for fabricating the solid electrolytic capacitor of the sixth embodiment, it is desirable to prepare current control means 20 in the form of an element, i.e., a current control element, comprising a first electrode member 22a, a second electrode member 22b and a current control layer 21 sandwiched between these members 22a, 22b as shown in FIG. 8, the element being separate from the capacitor element 15. Instead of the current control means 20 shown in FIG. 8, the current control means 20 shown in FIG. 2 can be joined to the anode leading member 16 and the anode terminal member 61, for example, with a conductive adhesive. In this case, conductive metal foil may be used as the second electrode member 22b. Although it has been difficult to provide the current control layer 21 on the anode side of the capacitor element 15 with conventional solid electrolytic capacitors, the present invention makes it easy to provide the current control layer 21 on the anode side by sandwiching the layer 21 between the electrode members 22a, 22b.

(Seventh Embodiment)

Figure 9:
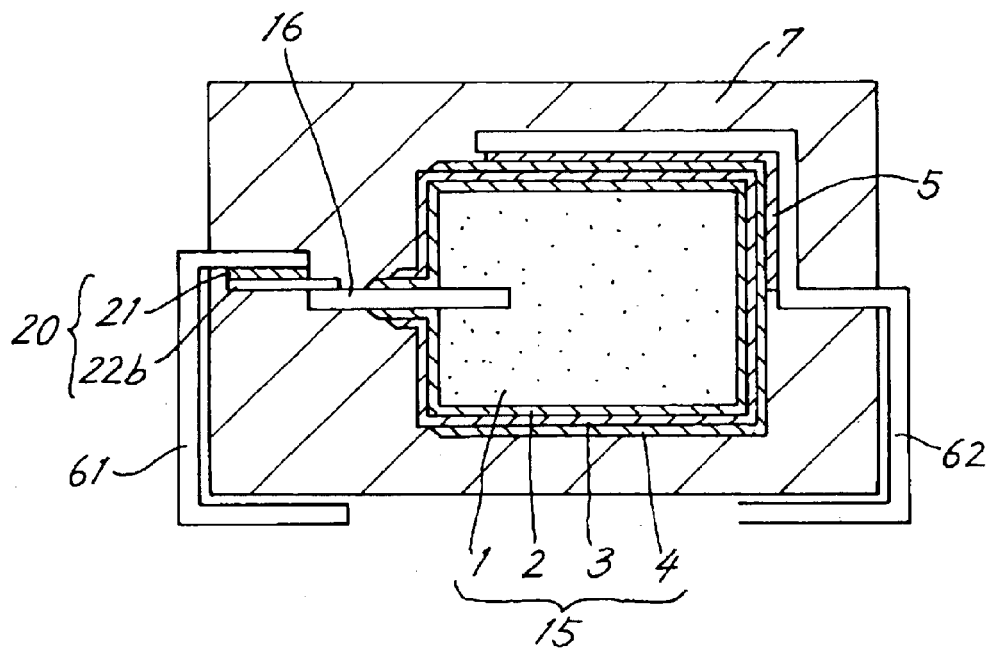
FIG. 9 is a view in vertical section and showing a solid electrolytic capacitor of seventh embodiment of the invention.

FIG. 9 is a view in vertical section and showing a solid electrolytic capacitor of seventh embodiment of the invention. According to this embodiment, the first electrode member 22a included in the sixth embodiment is dispensed with, and the current control layer 21 is sandwiched between the second electrode member 22b and a portion of the anode terminal member 61. The anode terminal member 61 serves also the function of the first electrode member 22a in the sixth embodiment. In other words, the anode terminal member 61 partly serves as the first electrode member 22a shown in FIG. 7. Since it is desirable to sandwich the current control layer 21 between electrode members of at least one of nickel and copper according to the invention, it is desirable that the anode terminal member 61 be made from at least one of nickel and copper. Alternatively, an anode terminal member 61 of a conductive metal (e.g., 42 alloy) other than nickel and copper may be plated with nickel or copper.

(Eighth Embodiment)

Figure 10:
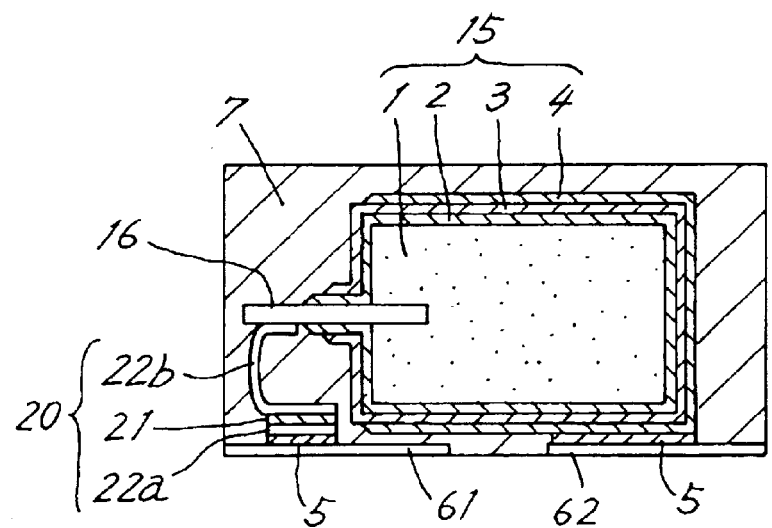
FIG. 10 is a view in vertical section and showing a solid electrolytic capacitor of eighth embodiment of the invention.

FIG. 10 is a view in vertical section and showing a solid electrolytic capacitor of eighth embodiment of the invention. According to this embodiment, the anode terminal member 61 and the cathode terminal member 62 are each in the form of a flat plate, and are positioned in a substantially same plane beneath the packaging resin portion 7 and spaced apart from each other. The cathode terminal member 62 is disposed under the anode body 1 and joined to the cathode leading layer 4 with the conductive adhesive 5. The anode leading member 16 extends substantially horizontally from the anode body 1 and is connected to the anode terminal member 61 by the current control means 20 disposed under the leading member 16. The first electrode member 22a of the control means 20 is joined to the anode terminal member 61 disposed under the control means 20 with the conductive adhesive 5. The second electrode member 22b comprises a planar portion joined to the current control layer 21, and an extension portion extending generally vertically from the planar portion. The extension portion has an end portion joined to the anode leading member 16, for example, by resistance welding.

(Ninth Embodiment)

Figure 11:
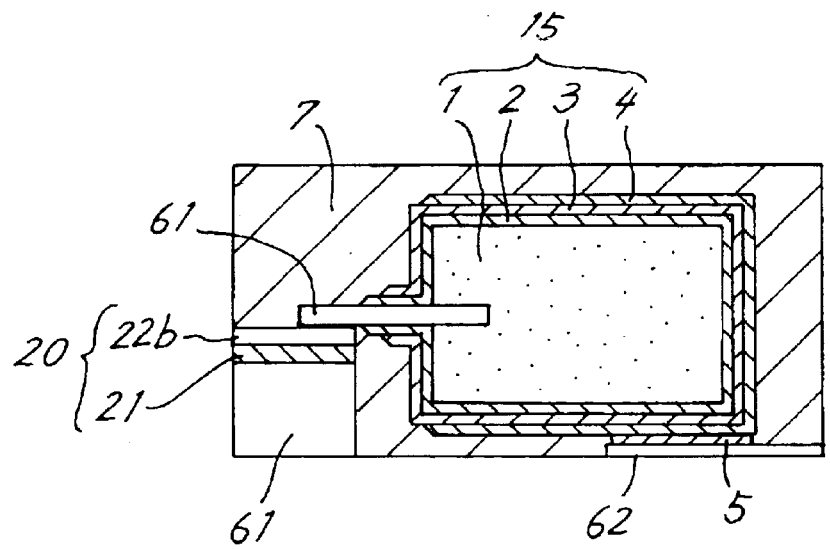
FIG. 11 is a view in vertical section and showing a solid electrolytic capacitor of ninth embodiment of the invention.

FIG. 11 is a view in vertical section and showing a solid electrolytic capacitor of ninth embodiment of the invention. According to this embodiment, the first electrode member 22a is dispensed with as in the seventh embodiment, and the current control layer 21 is sandwiched between the second electrode member 22b and the anode terminal member 61. The anode terminal member 61 is in the form of a block, and the bottom surface of the terminal member 61 is positioned substantially in the same plane as the bottom surface of the packaging resin portion 7. The current control layer 21 is disposed on the upper surface of the anode terminal member 61, and the second electrode member 22b is disposed on the upper surface of the current control layer 21. Joined to the upper surface of the second electrode member 22b is the anode leading member 16 projecting substantially horizontally from the anode body 1.

It is desired that the current control means 20 of the first to ninth embodiments be up to 10 Ω·cm in volume resistivity at room temperature, and that the current control means 20 be up to 1.0 mm in thickness.

Solid electrolytic capacitors of the invention were fabricated on experimental basis and checked for electrical characteristics as will be described below. The capacitors fabricated are according to the first embodiment shown in FIG. 1. The current control means 20 was 3 mm×3 mm×0.2 mm (thickness), the current control layer 21 was 0.15 mm in thickness, and the first electrode member 22a and the second electrode member 22b were both 0.025 mm in thickness. In fabricating each of the solid electrolytic capacitors, current control means 20 was first prepared in the form of an element shown in FIG. 2 and was then joined to a capacitor element 15. The current control layer 21 was produced from a polyethylene resin having conductive carbon black particles admixed therewith, by extruding the resin into a sheet. Pieces of nickel foil serving as the first and second electrode members 22a, 22b were thermally bonded to the current control layer 21 under pressure to obtain the current control means 20 in the form of an element.

Table 1 shows the results obtained by checking 26 solid electrolytic capacitors fabricated for capacitance (Cap) at 120 Hz, tangent of dielectric loss angle (dielectric loss) (tan δ) and ESR value at 100 kHz, as measured at room temperature (20° C.).

TABLE 1

| Sample No. | Cap (μF) | ESR (mΩ) | tanδ |
| --- | --- | --- | --- |
| 1 | 147.47 | 75.1 | 0.023 |
| 2 | 151.80 | 75.2 | 0.022 |
| 3 | 147.87 | 75.3 | 0.021 |
| 4 | 152.77 | 82.7 | 0.024 |
| 5 | 153.01 | 48.3 | 0.019 |
| 6 | 147.21 | 77.2 | 0.023 |
| 7 | 152.83 | 72.2 | 0.022 |
| 8 | 156.62 | 74.9 | 0.023 |
| 9 | 154.29 | 72.9 | 0.019 |
| 10 | 155.30 | 77.7 | 0.021 |
| 11 | 152.73 | 45.5 | 0.022 |
| 12 | 156.50 | 66.1 | 0.023 |
| 13 | 147.94 | 77.0 | 0.024 |
| 14 | 151.78 | 74.4 | 0.022 |
| 15 | 155.63 | 73.3 | 0.024 |
| 16 | 153.87 | 75.0 | 0.022 |
| 17 | 156.68 | 76.3 | 0.024 |
| 18 | 158.61 | 78.8 | 0.025 |
| 19 | 157.05 | 73.2 | 0.022 |
| 20 | 153.45 | 51.8 | 0.020 |
| 21 | 153.27 | 72.8 | 0.022 |
| 22 | 155.97 | 78.2 | 0.024 |
| 23 | 150.93 | 75.8 | 0.022 |
| 24 | 150.88 | 73.3 | 0.023 |
| 25 | 151.54 | 73.0 | 0.023 |
| 26 | 141.19 | 83.3 | 0.023 |

Table 2 shows the results obtained for 26 solid electrolytic capacitors wherein nickel-plated copper foil was used as the first and second electrode members 22a, 22b, by checking the capacitors for capacitance, dielectric loss and ESR value.

TABLE 2

| Sampl No. | Cap (μF) | ESR (mΩ) | tanδ |
| --- | --- | --- | --- |
| 1 | 149.26 | 77.6 | 0.023 |
| 2 | 151.08 | 79.0 | 0.020 |
| 3 | 152.36 | 84.1 | 0.026 |

TABLE 2-continued

| Sampl No. | Cap (μF) | ESR (mΩ) | tanδ |
| --- | --- | --- | --- |
| 4 | 149.84 | 80.9 | 0.023 |
| 5 | 149.97 | 78.3 | 0.023 |
| 6 | 152.11 | 80.7 | 0.024 |
| 7 | 151.47 | 81.3 | 0.020 |
| 8 | 150.65 | 76.8 | 0.021 |
| 9 | 148.87 | 78.2 | 0.022 |
| 10 | 150.64 | 79.9 | 0.024 |
| 11 | 149.48 | 80.4 | 0.019 |
| 12 | 153.71 | 78.1 | 0.023 |
| 13 | 149.18 | 86.7 | 0.021 |
| 14 | 148.22 | 80.7 | 0.020 |
| 15 | 150.58 | 79.5 | 0.021 |
| 16 | 151.03 | 76.0 | 0.020 |
| 17 | 150.69 | 77.4 | 0.025 |
| 18 | 149.42 | 80.4 | 0.019 |
| 19 | 153.12 | 78.3 | 0.022 |
| 20 | 152.87 | 79.6 | 0.026 |
| 21 | 150.47 | 82.2 | 0.027 |
| 22 | 147.58 | 81.4 | 0.020 |
| 23 | 149.87 | 85.3 | 0.023 |
| 24 | 147.99 | 86.0 | 0.025 |
| 25 | 151.02 | 78.1 | 0.020 |
| 26 | 150.67 | 79.7 | 0.021 |

Figure 12:
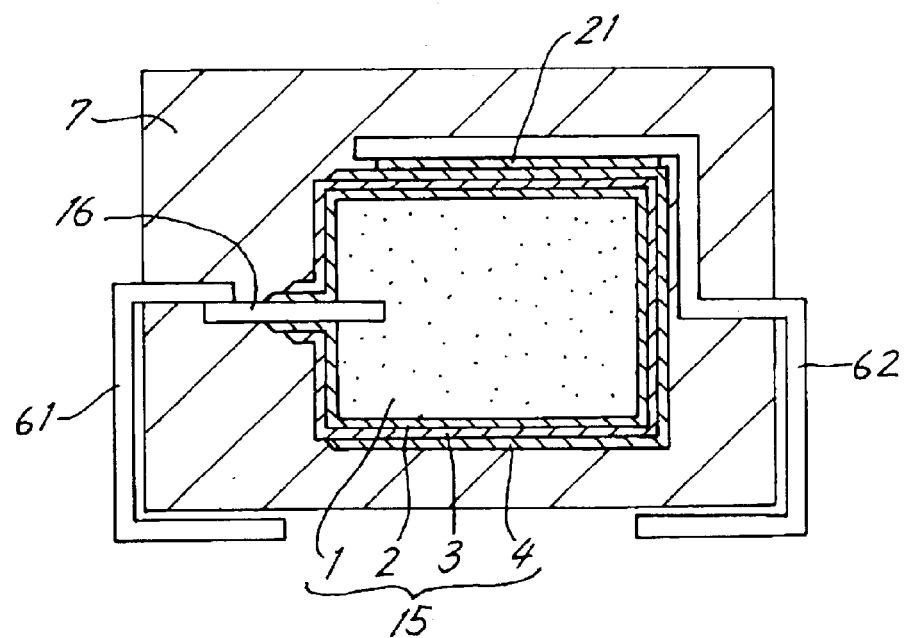
FIG. 12 is a view in vertical section and showing a conventional solid electrolytic capacitor fabricated as a comparative example.

Table 3 shows the averages of the values given in Tables 1 and 2, and the result obtained for the solid electrolytic capacitor of comparative example, by checking the capacitor for capacitance, ESR and dielectric loss under the same conditions as above. FIG. 12 is a view in vertical section and showing the solid electrolytic capacitor of comparative example. The capacitor of comparative example corresponds in construction to the capacitor of the first embodiment fabricated above, from which the first and second electrodes 22a, 22b are omitted (i.e., the same construction as the solid electrolytic capacitor disclosed in the publication of JP-A No. 1997-129520). Stated more specifically, the capacitor of comparative example comprises a current control layer 21 having the same size as in the capacitor of the first embodiment fabricated and formed on a cathode leading layer 4 of a capacitor element 15, and a cathode terminal member 62 joined to the current control layer 21. In fabricating the capacitor of comparative example, the current control layer 21 prepared in the same manner as above was joined to the cathode leading layer 4 of the capacitor element 15 and the cathode terminal member 62 by being heated as sandwiched between the cathode leading layer 4 and the cathode terminal member 62.

TABLE 3

| | Cap (μF) | ESR (mΩ) | tanδ |
| --- | --- | --- | --- |
| Embodiment (Ni) | 152.58 | 72.3 | 0.022 |
| Embodiment (Cu—Ni) | 150.47 | 77.6 | 0.023 |
| Comparative example | 145.3 | 594 | 0.075 |

Table 3 reveals that the ESR values of the solid electrolytic capacitors fabricated according to the first embodiment are reduced to about ⅛ of the value of the capacitor of comparative example in both the case where nickel foil was used as the electrode members 22a, 22b and the case where nickel-plated copper foil was used for these members. The dielectric loss values of the capacitors were as small as about ⅓ of the corresponding value of the capacitor of comparative example. Thus, the current control layer 21 sandwiched between the first and second electrode members 22a, 22b achieved the result of dramatically reducing the ESR and dielectric loss of the solid electrolytic capacitor.

Next, the solid electrolytic capacitors fabricated according to the first embodiment (wherein nickel foil was used for the electrode members 22a, 22b) were tested for operation with the results to be described below. The operation test was conducted by passing varying values of current (d.c.) through the capacitor as short-circuited, at a specified voltage of 6.3 V. Each capacitor fabricated was short-circuited by applying an overvoltage of 20 V thereto for 1 second. (The short-circuit current was 0.05 A at this time.) Table 4 shows the results of operation test. "Control time" given in Table 4 is a period of time taken to control the current (until the short-circuit current markedly diminished) after the start of passage of current. "Maximum temperature" means a maximum capacitor temperature during a measuring period (of about 60 seconds). By "final voltage," "final current" and "final temperature" are meant the capacitor voltage, capacitor current and capacitor temperature upon the lapse of the measuring period.

TABLE 4

| Current setting (A) | Control time (sec) | Max. temp. (° C.) | Final voltage (V) | Final current (A) | Final temp. (° C.) | Note |
|---|---|---|---|---|---|---|
| 0.1 | | 30 | 0.13 | 0.1 | 30 | not controlled |
| 0.2 | | 39 | 0.29 | 0.2 | 39 | not controlled |
| 0.3 | | 55 | 0.44 | 0.3 | 55 | not controlled |
| 0.4 | | 84 | 0.66 | 0.4 | 84 | not controlled |
| 0.5 | 17 | 132 | 6.28 | 0.07 | 102 | Temp. controlled |
| 0.6 | 9 | 128 | 6.29 | 0.07 | 103 | Temp. controlled |
| 0.8 | 4 | 136 | 6.30 | 0.07 | 103 | Temp. controlled |
| 0.9 | 4 | 162 | 6.30 | 0.07 | 102 | Temp. controlled |
| 1.0 | 4 | 155 | 6.30 | 0.07 | 102 | Temp. controlled |
| 1.5 | 0 | 40 | 6.30 | 0.02 | 40 | current controlled |
| 2.0 | 0 | 38 | 6.30 | 0.01 | 38 | current controlled |
| 3.0 | 0 | 39 | 6.30 | 0.01 | 39 | current controlled |
| 5.0 | 0 | 45 | 6.30 | 0.01 | 45 | current controlled |
| 5.0 (6000s) | 0 | 105 | 6.30 | 0.06 | 105 | current controlled |

The short-circuit current was not found controllable within the measuring period in the case where the current setting was 0.1 to 0.4 A. When the current setting was 0.5 A, the short-circuit current markedly decreased 17 seconds after the start of passage of current, finally decreasing to 0.07 A from 0.5 A. The capacitor temperature rising to a maximum of 132° C. dropped to 102° C. The short-circuit current was found controllable 4 seconds after the start of passage of current also when the current setting was 0.6 to 1.0 A.

Table 4, the column of "maximum temperature" indicates that the control of the short-circuit current effected when the current setting is 0.5 to 1.0 A is attributable to a rise in temperature to about 120 to about 130° C. Thus, the solid electrolytic capacitor of the invention is adapted to control current at lower temperature than the solid electrolytic capacitor having the conventional current control layer.

When the current setting is not lower than 1.5 A, short-circuit current control attributable to the current value (current control) is effected instead of the short-circuit current control attributable to the temperature (temperature control). Because the current setting is great, the resistance value of the current control layer increases instantaneously to diminish the short-circuit current immediately after the start of measurement. Incidentally, Table 4, the lowest line indicates the test result obtained upon the lapse of 6000 seconds after the start of passage of current when the current setting was 5 A. The temperature then measured was 105° C. The final temperatures measured at current settings of 0.5 to 1.0 A were comparable to this value. This reveals that the solid electrolytic capacitor of the present invention is maintained at a temperature of about 100° C. even in the event of short-circuiting. Thus, the short-circuiting of the capacitor of the invention is unlikely to cause fuming or ignition of a board provided with the capacitor or of the packaging resin of the capacitor.

Figure 13A:
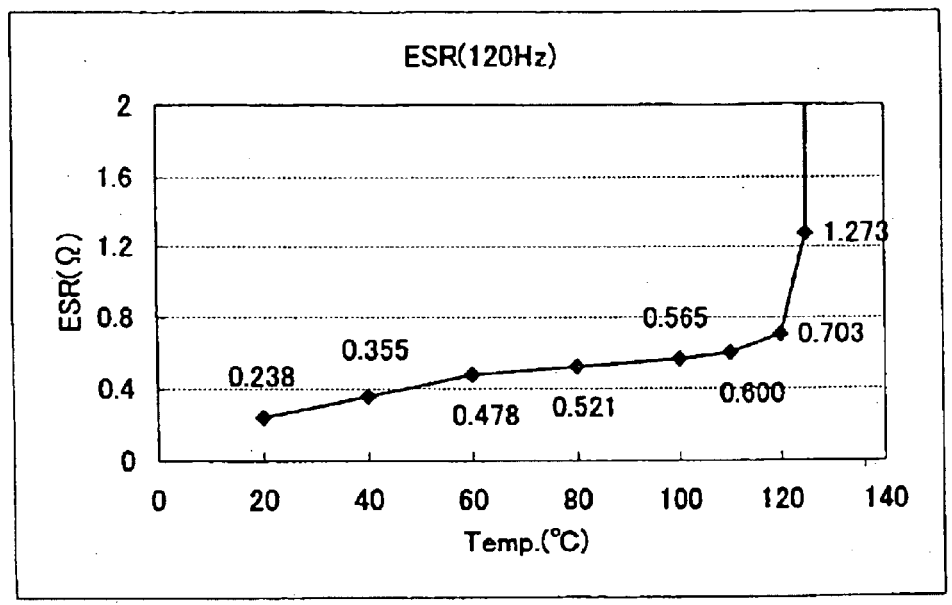
FIG. 13A is a graph showing temperature variations of ESR of solid electrolytic capacitor of the invention when alternating current of 120 Hz is applied to the capacitor.
Figure 13B:
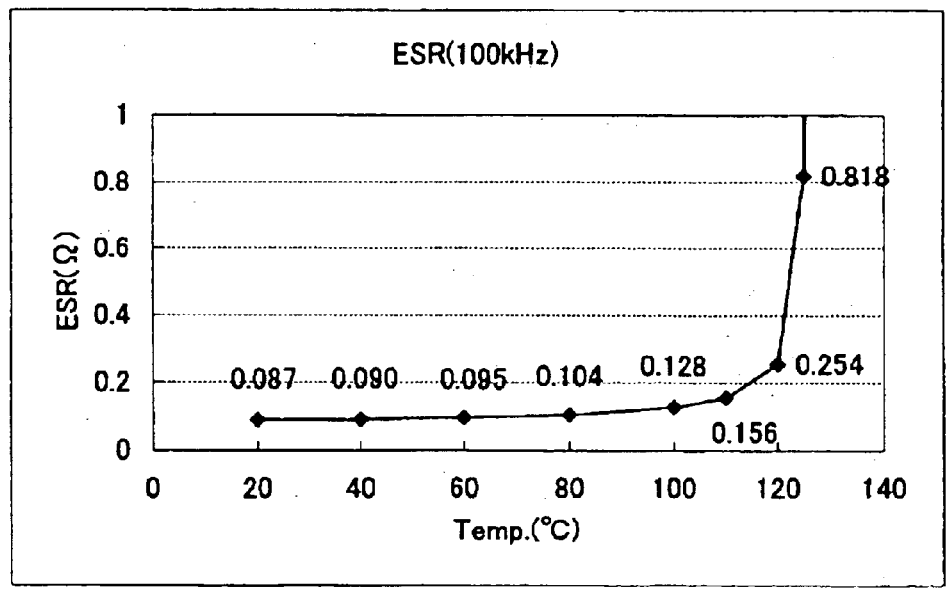
FIG. 13B is a graph showing temperature variations of ESR of solid electrolytic capacitor of the invention when alternating current of 120 kHz is applied to the capacitor.
Figure 14:
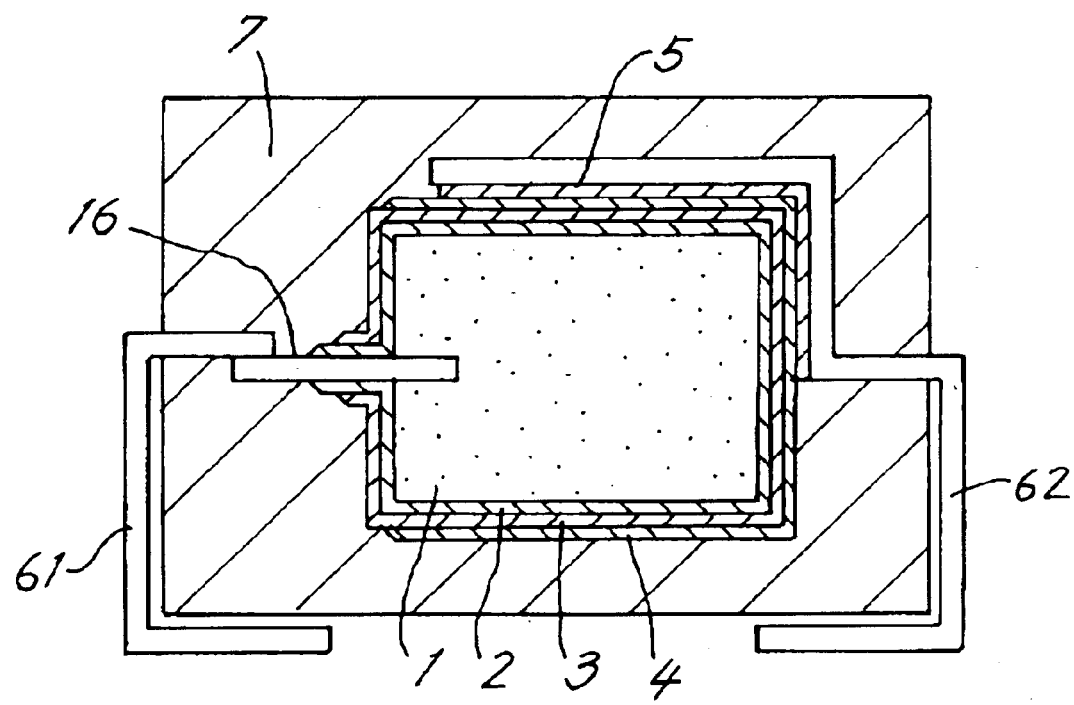
FIG. 14 is a view in vertical section of a conventional solid electrolytic capacitor.

FIGS. 13A and 13B show temperature variations of ESR of the solid electrolytic capacitors fabricated according to the first embodiment (wherein nickel foil was used for the electrode members 22a, 22b). FIG. 13A shows temperature variations of ESR produced by the application of a.c. voltage of 120 Hz at 0.5 Vrms. FIG. 13B shows temperature variations of ESR produced by the application of a.c. voltage of 120 kHz at 0.5 Vrms. Although not shown in FIG. 13A, ESR at 130° C. is 23.155 Ω. Although not shown in FIG. 13B, ESR at 130° C. is 22.683 Ω. The measurements obtained indicate that at a capacitor temperature of about 120° C., the current control layer 21 acts to markedly increase the ESR regardless of the frequency of the applied voltage.

With the solid electrolytic capacitors of the foregoing embodiments, a conductive organic material is used for the solid electrolyte layer, whereas use of a conductive inorganic material such as manganese dioxide in the solid electrolytic capacitor leads to the same advantages as described above. The carbon used as conductive particles for the current control layer may alternatively be conductive particles of copper, silver or the like. The current control layer may be formed from an insulating resin which is comparable in melting point to polyethylene resin (about 110 to 140° C. in melting point), such as polypropylene resin (about 170° C.).

The embodiments described above are intended to illustrate the present invention and should not be construed as restricting the invention set forth in the appended claims or reducing the scope thereof. The capacitor of the invention is not limited to the foregoing embodiments in construction but can of course be modified variously within the technical scope defined in the claims.

What is claimed is:

1. A solid electrolytic capacitor comprising a capacitor element including an anode body having an anode leading member, and a dielectric coating layer, a solid electrolyte layer and a cathode leading layer which are formed successively over a surface of the anode body, the anode leading member having an anode terminal member connected thereto, the cathode leading layer having a cathode terminal member connected thereto, the capacitor element being covered with a packaging resin portion, the solid electrolytic capacitor being characterized in that the cathode terminal member is connected to the cathode leading layer with current control means provided therebetween, the current control means comprising a current control layer reversibly increasable in electrical resistance with overcurrent or excessive heat, and a pair of electrode members each in the form of a plate or foil and having the current control layer sandwiched therebetween, the electrode members being joined to the cathode leading layer and the cathode terminal member respectively.

2. A solid electrolytic capacitor according to claim 1 wherein the anode terminal member is disposed under the anode leading member projecting generally horizontally from the anode body, the current control means being disposed under the anode body, the cathode terminal member being disposed under the current control means.

3. A solid electrolytic capacitor according to claim 1 wherein the capacitor element is generally in the form of a rectangular parallelepiped, and the capacitor element has a surface joined to and covered with the current control means.

4. A solid electrolytic capacitor according to claim 1 wherein the current control layer is a layer prepared from an insulating polymer having electrically conductive particles admixed therewith.

5. A solid electrolytic capacitor comprising a capacitor element including an anode body having an anode leading member, and a dielectric coating layer, a solid electrolyte layer and a cathode leading layer which are formed successively over a surface of the anode body, the anode leading member having an anode terminal member connected thereto, the cathode leading layer having a cathode terminal member connected thereto, the capacitor element being covered with a packaging resin portion, the solid electrolytic capacitor being characterized in that the cathode terminal member is connected to the cathode leading layer with current control means provided therebetween, the current control means comprising a current control layer reversibly increasable in electrical resistance with overcurrent or excessive heat, and an electrode member in the form of a plate or foil, the current control layer being sandwiched between the electrode member and the cathode terminal member, the electrode member being joined to the cathode leading layer.

6. A solid electrolytic capacitor according to claim 5 wherein the anode terminal member is disposed under the anode leading member projecting generally horizontally from the anode body, the current control means being disposed under the anode body, the cathode terminal member being disposed under the current control means.

7. A solid electrolytic capacitor according to claim 5 wherein the capacitor element is generally in the form of a rectangular parallelepiped, and the capacitor element has a surface joined to and covered with the current control means.

8. A solid electrolytic capacitor according to claim 5 wherein the current control layer is a layer prepared from an insulating polymer having electrically conductive particles admixed therewith.

9. A solid electrolytic capacitor comprising a capacitor element including an anode body having an anode leading member, and a dielectric coating layer, a solid electrolyte layer and a cathode leading layer which are formed successively over a surface of the anode body, the anode leading member having an anode terminal member connected thereto, the cathode leading layer having a cathode terminal member connected thereto, the capacitor element being covered with a packaging resin portion, the solid electrolytic capacitor being characterized in that the anode terminal member is connected to the anode leading member with current control means provided therebetween, the current control means comprising a current control layer reversibly increasable in electrical resistance with overcurrent or excessive heat, and a pair of electrode members each in the form of a plate or foil and having the current control layer sandwiched therebetween, the electrode members being joined to the anode leading member and the anode terminal member respectively.

10. A solid electrolytic capacitor according to claim 9 wherein the electrode member joined to the anode leading member has an extension portion not in contact with the current control layer, and the extension portion is joined to the anode leading member.

11. A solid electrolytic capacitor according to claim 9 wherein the current control means is disposed under the anode leading member projecting generally horizontally from the anode body, the anode terminal member being disposed under the current control means, the cathode terminal member being disposed under the anode body.

12. A solid electrolytic capacitor according to claim 9 wherein the current control layer is a layer prepared from an insulating polymer having electrically conductive particles admixed therewith.

13. A solid electrolytic capacitor comprising a capacitor element including an anode body having an anode leading member, and a dielectric coating layer, a solid electrolyte layer and a cathode leading layer which are formed successively over a surface of the anode body, the anode leading member having an anode terminal member connected thereto, the cathode leading layer having a cathode terminal member connected thereto, the capacitor element being covered with a packaging resin portion, the solid electrolytic capacitor being characterized in that the anode terminal member is connected to the anode leading member with current control means provided therebetween, the current control means comprising a current control layer reversibly increasable in electrical resistance with overcurrent or excessive heat, and an electrode member in the form of a plate or foil, the current control layer being sandwiched between the electrode member and the anode terminal member, the electrode member being joined to the anode leading member.

14. A solid electrolytic capacitor according to claim 13 wherein the electrode member has an extension portion not in contact with the current control layer, and the extension portion is joined to the anode leading member.

15. A solid electrolytic capacitor according to claim 13 wherein the current control means is disposed under the anode leading member projecting generally horizontally from the anode body, the anode terminal member being disposed under the current control means, the cathode terminal member being disposed under the anode body.

16. A solid electrolytic capacitor according to claim 13 wherein the current control layer is a layer prepared from an insulating polymer having electrically conductive particles admixed therewith.

17. A solid electrolytic capacitor comprising a current control layer for controlling short-circuit current, the current control layer being prepared from an insulating polymer having electrically conductive particles admixed therewith and being sandwiched between a pair of electrode members made of at least one of nickel and copper.

18. A solid electrolytic capacitor according to claim 17 wherein at least one of the electrode members is a nickel plate, nickel foil, copper plate, copper foil, nickel-plated copper plate or nickel-plated copper foil.

19. A solid electrolytic capacitor according to claim 17 wherein the current control layer and the electrode members are provided in the form of an element.

20. A solid electrolytic capacitor according to claim 17 wherein the insulating polymer is a polyethylene resin.

21. A solid electrolytic capacitor according to claim 17 which comprises a capacitor element including an anode body having an anode leading member, and a dielectric coating layer, a solid electrolyte layer and a cathode leading layer which are formed successively on the anode body.

22. A solid electrolytic capacitor according to claim 21 which comprises a cathode terminal member connected to the cathode leading layer, one of the electrode members being joined to the cathode leading layer, the other electrode member being joined to the cathode terminal member.

23. A solid electrolytic capacitor according to claim 21 which comprises an anode terminal member connected to the anode leading member, one of the electrode members being joined to the anode leading member, the other electrode member being joined to the anode terminal member.

24. A solid electrolytic capacitor according to claim 21 which comprises a cathode terminal member connected to the cathode leading layer, one of the electrode members being joined to the cathode leading layer, the cathode terminal member having a portion serving as the other electrode member.

25. A solid electrolytic capacitor according to claim 21 which comprises an anode terminal member connected to the anode leading member, one of the electrode members being joined to the anode leading member, the anode terminal member having a portion serving as the other electrode member.

26. A current control element comprising a current control layer for controlling short-circuit current of a solid electrolytic capacitor, the current control layer being prepared from an insulating polymer having electrically conductive particles admixed therewith and being sandwiched between a pair of electrode members made of at least one of nickel and copper.

27. A process for fabricating a solid electrolytic capacitor having low equivalent series resistance and comprising a current control layer for controlling short-circuit current, the process including the step of joining a current control element according to claim 26 to a capacitor element.

* * * * *